US010959070B2

(12) United States Patent
Adachi

(10) Patent No.: US 10,959,070 B2
(45) Date of Patent: Mar. 23, 2021

(54) RADIO TERMINAL AND BASE STATION

(71) Applicant: KYOCERA Corporation, Kyoto (JP)

(72) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/368,151

(22) Filed: Mar. 28, 2019

(65) Prior Publication Data

US 2019/0222983 A1 Jul. 18, 2019

Related U.S. Application Data

(63) Continuation of application No. PCT/JP2017/034529, filed on Sep. 25, 2017.

(60) Provisional application No. 62/402,251, filed on Sep. 30, 2016.

(51) Int. Cl.
| | |
|---|---|
| *H04W 4/40* | (2018.01) |
| *H04W 76/27* | (2018.01) |
| *H04W 8/22* | (2009.01) |
| *H04W 72/04* | (2009.01) |
| *H04W 92/18* | (2009.01) |
| *H04W 72/02* | (2009.01) |

(52) U.S. Cl.
CPC ............... *H04W 4/40* (2018.02); *H04W 8/22* (2013.01); *H04W 72/02* (2013.01); *H04W 72/042* (2013.01); *H04W 76/27* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 2016/0044678 A1* | 2/2016 | Kwon | H04W 76/27 370/329 |
| 2018/0020387 A1* | 1/2018 | Van Der Velde | H04W 74/02 |
| 2018/0042023 A1* | 2/2018 | Sheng | H04W 76/14 |
| 2018/0146398 A1* | 5/2018 | Kim | H04W 72/0406 |
| 2019/0075548 A1* | 3/2019 | Lee | H04W 88/06 |
| 2019/0090250 A1* | 3/2019 | Lee | H04W 72/02 |

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS 36.300 V13.4.0; Jun. 2016; pp. 1-310; Release 13; 3GPP Organizational Partners.

(Continued)

*Primary Examiner* — Gregory B Sefcheck
*Assistant Examiner* — Jenkey Van
(74) *Attorney, Agent, or Firm* — Studebaker & Brackett PC

(57) ABSTRACT

A user equipment as a pedestrian user equipment (UE) performs P2X communication that is a direct inter-terminal communication with another user equipment. The user equipment receives a message including a resource pool from a base station. When the user equipment is in a radio resource control (RRC) idle state, determines whether or not the message include a resource pool for the P2X communication. In accordance with a determination that the message does not include the resource pool for the P2X communication, transitions from the RRC idle state to an RRC connected state for requesting a radio resource for the P2X communication to the base station.

5 Claims, 7 Drawing Sheets

(56) References Cited

U.S. PATENT DOCUMENTS

| | | | |
|---|---|---|---|
| 2019/0116586 A1* | 4/2019 | Basu Mallick | H04W 72/048 |
| 2019/0191442 A1* | 6/2019 | Lu | H04W 74/006 |
| 2019/0222983 A1* | 7/2019 | Adachi | H04W 72/042 |
| 2019/0364501 A1* | 11/2019 | Kwon | H04W 72/042 |

OTHER PUBLICATIONS

NTT Docomo, Inc.; "Evaluation and Discussion on Resource Selection for Pedestrian UEs"; 3GPP TSG RAN WG1 Meeting #86; R1-167886; Aug. 22-26, 2016; pp. 1-6; Gothenburg, Sweden.

LG Electronics Inc.; "Discussion on Authorization for Vehicular Communication"; 3GPP TSG-RAN WG3 Meeting #92; R3-161094; May 23-27, 2016; pp. 1-3; Nanjing, China.

LG Electronics Inc.; "Support of inter-PLMN for PC5 and Uu"; 3GPP TSG-RAN3 Meeting #93; R3-161835; Aug. 22-26, 2016; pp. 1-2; Gothenburg, Sweden.

* cited by examiner

RADIO TERMINAL AND BASE STATION

CROSS-REFERENCE TO RELATED APPLICATION

The present application is a continuation based on PCT Application No. PCT/JP2017/034529 filed on Sep. 25, 2017, which claims the benefit of U.S. Provisional Application No. 62/402,251 (filed Sep. 30, 2016). The content of which are incorporated by reference herein in their entirety.

TECHNICAL FIELD

The present disclosure relates to a radio terminal and a base station.

BACKGROUND ART

In 3rd generation partnership project (3GPP) which is a standardization project of mobile communication system, specifications for direct signaling (Sidelink) between terminals are being developed (see Non Patent Literature 1).

CITATION LIST

Non Patent Literature

Non patent Literature 1: 3GPP technical specification "TS36.300 V13.4.0" Jul. 7, 2016

SUMMARY

A radio terminal according to one embodiment is a pedestrian user equipment (UE). The radio terminal comprises: a transmitter configured to perform direct inter-terminal communication with another radio terminal; a receiver configured to receive from a base station a resource pool to be transmitted to the pedestrian UE; and a controller configured to determine whether or not the resource pool is usable for the inter-terminal communication according to a type of the resource pool.

A base station according to one embodiment comprises: a receiver configured to receive from a first radio terminal as a pedestrian user equipment (UE) a message for requesting a radio resource for direct inter-terminal communication with a second radio terminal; and a controller configured to determine a radio resource to be allocated to the first radio terminal according to capability of the first radio terminal.

DESCRIPTION OF EMBODIMENT

Overview or Embodiments

Figure 1:
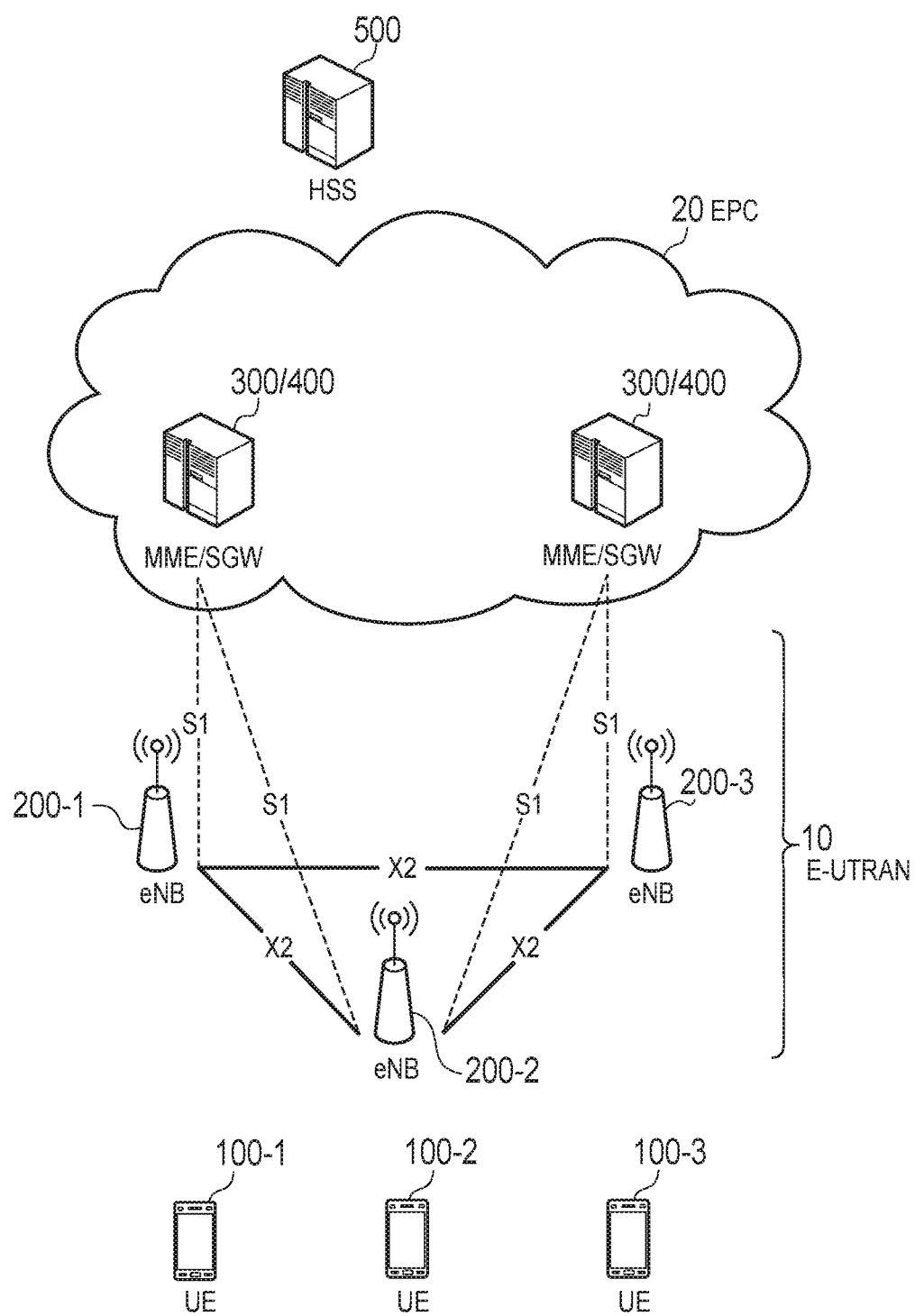
FIG. 1 is a diagram illustrating a configuration of an LTE system.

In recent years, there has been discussed pedestrian-to-vehicle (P2V) communication between a radio terminal having a pedestrian-type function (pedestrian UE: P-UE) and a radio terminal having a vehicle-type function (vehicle UE: VUE).

However, the current specifications do not prescribe radio resources usable by the P-UE for P2V communication. Therefore, P2V communication may not be executed properly.

A radio terminal according to one embodiment is a pedestrian user equipment (UE). The radio terminal comprises: a transmitter configured to perform direct inter-terminal communication with another radio terminal; a receiver configured to receive from a base station a resource pool to be transmitted to the pedestrian UE; and a controller configured to determine whether or not the resource pool is usable for the inter-terminal communication according to a type of the resource pool.

The controller may be configured to determine whether or not the resource pool is usable according to the type of the resource pool and capability of the radio terminal.

The controller may be configured to determine that the resource pool is usable when the resource pool is a resource pool requiring sensing for use of the resource pool.

The resource pool may be a resource pool requiring no sensing for use of the resource pool. The controller may be configured to determine that the resource pool is usable when the radio terminal has no reception capability in the inter-terminal communication.

The controller may be configured to, when the radio terminal is in a radio resource control (RRC) idle state, in accordance with the determination that the resource pool is unusable, start control to transition from the RRC idle state to an RRC connected state for requesting a radio resource for the inter-terminal communication to the base station.

The controller may be configured to include information indicating whether or not the radio terminal is the pedestrian UE in a message for requesting the radio resource. The transmitter may be configured to transmit the message to the base station.

The transmitter may be configured to transmit to the base station information indicating whether or not the radio terminal is the pedestrian UE.

A base station according to one embodiment comprises: a receiver configured to receive from a first radio terminal as a pedestrian user equipment (UE) a message for requesting a radio resource for direct inter-terminal communication with a second radio terminal; and a controller configured to determine a radio resource to be allocated to the first radio terminal according to capability of the first radio terminal.

The controller may be configured to allocate a resource pool requiring sensing as the radio resource when the first radio terminal has reception capability in the inter-terminal communication.

The base station may further comprise a transmitter configured to inform the first radio terminal of information indicating at least one of a cell and a frequency where the inter-terminal communication between the pedestrian user equipment (UE) and a vehicle UE is recommended.

Embodiments (Mobile Communication System)

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication apparatus (e.g., radio terminal). The UE 100 is a mobile communication apparatus.

The UE 100 may be a radio terminal having a pedestrian-type function. For example, the UE 100 is a radio terminal that can be carried by a pedestrian. The UE 100 may permanently have a pedestrian-type function. The UE 100 may have a pedestrian-type function only when a predetermined condition is satisfied.

Figure 4:
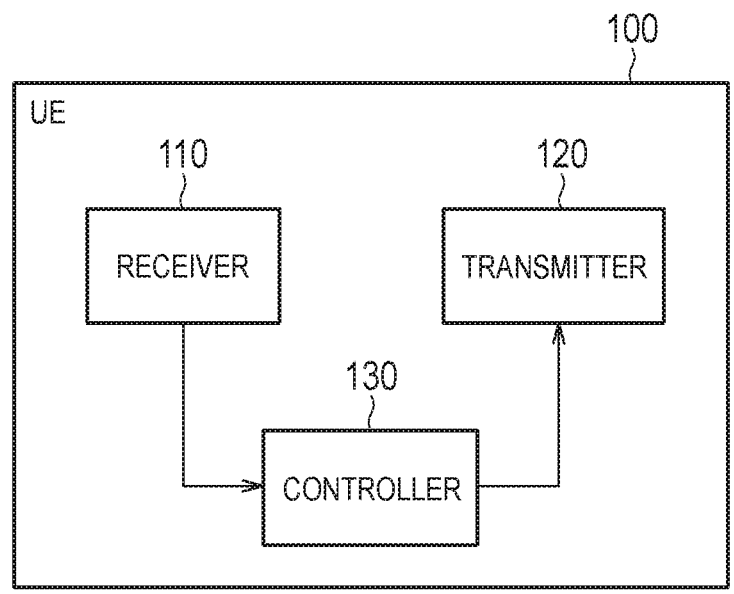
FIG. 4 is a block diagram of an UE 100.

When the UE 100 has a battery that supplies power to each device (for example, the receiver 110, the transmitter 120, the controller 130 illustrated in FIG. 4 to be described later) that configures the UE 100, the UE 100 may have a pedestrian-type function. When the UE 100 does not have a battery, that is, when electric power is supplied from the outside to the UE 100, the UE 100 may not have the pedestrian-type function.

The UE 100 may have the pedestrian-type function when performing low-speed movement or stopping. The UE 100 may have a pedestrian-type function only when traveling speed is less than a threshold (for example, 10 km/h) indicating a low-speed movement. When the moving speed is equal to or higher than the threshold value, the UE 100 may not have the pedestrian-type function.

The UE 100 may have the pedestrian-type function only when acceleration is less than a threshold value. When the acceleration is equal to or higher than the threshold value, the UE 100 may not have the pedestrian-type function.

The UE 100 may have the pedestrian-type function when desiring use of a radio resource (resource pool) for Pedestrian UE (P-UE) 100. The UE 100 may have the pedestrian-type function when interested in using the radio resource (resource pool) for the P-UE 100. The UE 100 may not have the pedestrian-type function when not desiring use of the radio resource (resource pool) for the P-UE 100. The UE 100 may not have the pedestrian-type function if it is not interested (no longer interested) in using the radio resource (resource pool) for the P-UE 100.

The UE 100 may have the pedestrian-type function when not provided in a vehicle. When the UE 100 is provided in a vehicle, the UE 100 may not have the pedestrian-type function.

The UE 100 may have the pedestrian-type function when estimated as the P-UE 100. For example, the UE 100 may be estimated to be the P-UE 100 if it is a UE 100 to avoid collision by a vehicle. The UE 100 may be estimated to be the P-UE 100 if it should be careful of a vehicle. The UE 100 may have the pedestrian-type function when estimated as a UE 100 held by a pedestrian with respect to a vehicle.

The UE 100 may have the pedestrian-type function only when activating (executing) a predetermined application (for example, an application relating to a pedestrian operation). When the UE 100 does not activate (execute) the predetermined application, the UE 100 may not have the pedestrian-type function.

The UE 100 may not have the pedestrian-type function only when the UE 100 does not activate (execute) a predetermined application (for example, an application related to the operation of a vehicle). When the UE 100 does not activate (execute) the predetermined application, the UE 100 may have a pedestrian-type function.

The UE 100 may be a radio terminal having a vehicle-type function. For example, the UE 100 may be a vehicle (Vehicle UE) 100 having a communication function. The UE 100 may be the vehicle itself (for example, a car, a motorcycle, etc.). The UE 100 may be a communication module detachable from a vehicle. The UE 100 may permanently have the vehicle-type function. The UE 100 may have the vehicle-type function only when a predetermined condition is satisfied. The predetermined condition is at least one of the following.

When the UE 100 does not have a battery, the UE 100 may have a vehicle type function. When the UE 100 has a battery, the UE 100 may not have a vehicle type function.

The UE 100 may have the vehicle-type function when executing high-speed movement. The UE 100 may have the vehicle-type function only when a traveling speed is equal to or greater than a threshold (for example, 10 km/h) indicating a high-speed movement. When the moving speed is less than the threshold value, the UE 100 may not have the vehicle-type function. The UE 100 may (temporarily) lose the vehicle-type function only when a predetermined time period has elapsed for a period in which the moving speed is lower than the threshold indicating the high-speed movement. The UE 100 may have the vehicle-type function when a period during which the moving speed is lower than the threshold indicating the high-speed movement has not passed the predetermined period of time.

The UE 100 may have the vehicle-type function only when a acceleration is equal to or greater than a threshold value. When the acceleration is less than the threshold value, the UE 100 may not have the vehicle-type function. The UE 100 may (temporarily) lose the vehicle-type function only when the predetermined time period has elapsed for a period when the acceleration falls below the threshold value. The UE 100 may have the vehicle-type function when the period during which the acceleration falls below the threshold has not passed the predetermined period.

The UE 100 may have the vehicle-type function when it is provided in a vehicle. When the UE 100 is not provided in a vehicle, the UE 100 may have the vehicle-type function.

The UE 100 may have the vehicle-type function when it is estimated as a V-UE 100. For example, the UE 100 may be estimated as the V-UE 100 when it is a UE 100 that should avoid collision with the P-UE 100 A. The UE 100 may be estimated as the V-UE 100 when it is careful of the P-UE 100 A. The UE 100 may have the vehicle-type function when it is estimated as the UE 100 provided in the vehicle.

The UE 100 may have the vehicle-type function only when activating (executing) a predetermined application (for example, an application related to vehicle operation). When the UE 100 does not activate (execute) the predetermined application, the UE 100 may not have the vehicle-type function.

The UE 100 may not have the vehicle-type function only when it does not activate (execute) a predetermined application (for example, an application relating to pedestrian operation). When the UE 100 does not activate (execute) the predetermined application, the UE 100 may have the vehicle-type function.

UE 100 may perform radio communication (Uplink/Downlink) with a cell (eNB 200 to be described later). UE 100 may be able to perform direct signaling transmission and/or reception with other communication devices. For example, the UE 100 is capable of executing P2V (Pedestrian-to-Vehicle) communication. The UE 100 may be capable of executing at least one of V2X (Vehicle-to-Everything) communication (for example, V2V: Vehicle-to-Vehicle (V2V) communication, Vehicle-to-Infrastructure (V2I)

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The operation of the eNB 200 may be regarded as the operation of the E-UTRAN 10.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" may be used as a term indicating the minimum unit of a radio communication area. The "cell" may be used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300, an SGW (Serving Gateway) 400 and a PGW 500.

The MME 300 performs, for example, various kinds of mobility control for the UE 100. The SGW 400 performs, for example, data transfer control. The MME 300 and the SGW 400 are connected to the eNB 200 via a S1 interface.

An HSS (Home Subscriber Server) 500 may be provided outside the EPC 20. The HSS 500 is a node (NW apparatus) that manages subscriber information of the UE 100.

Figure 2:
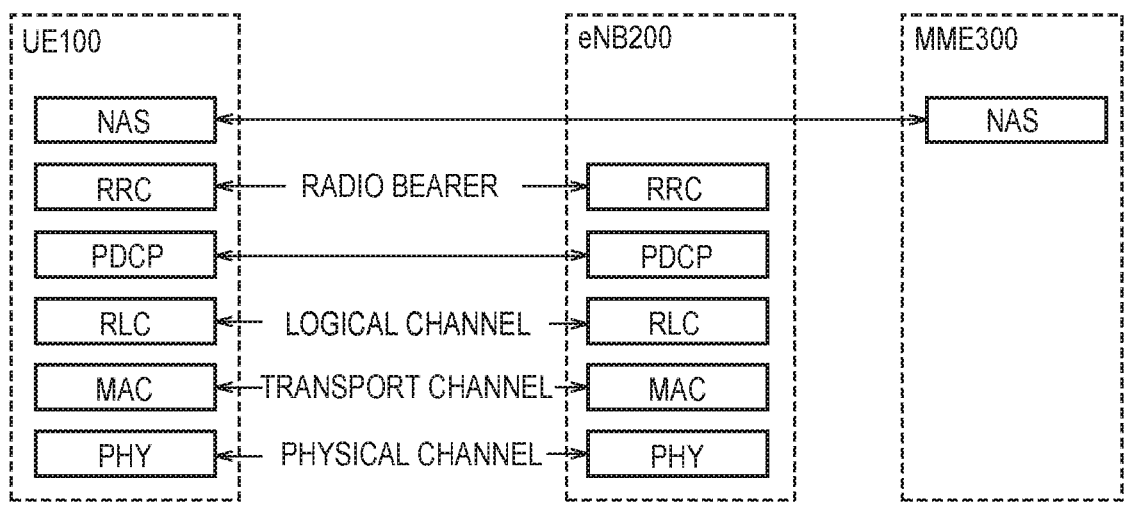
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
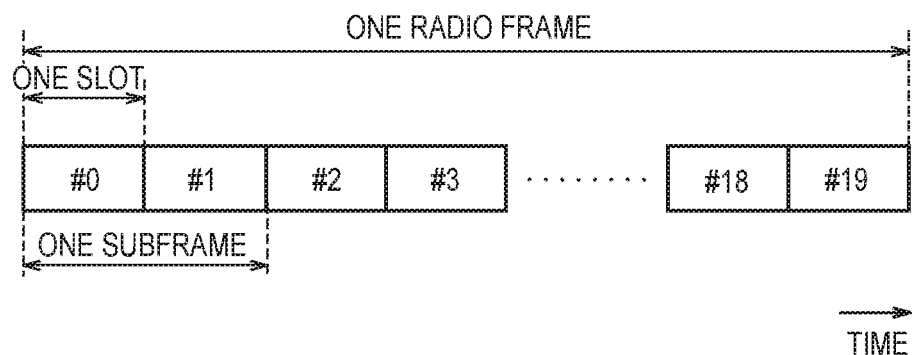
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Proximity-Based Service)

Proximity-based services (ProSes) will be described. The proximity-based service is a service that can be provided by a 3GPP system, based on communication devices (for example, UEs 100) in the vicinity of each other.

In the ProSe, various types of radio signals are directly transmitted and received via a direct radio link between nodes (for example, between UEs), without passing through the network (e.g., the eNB 200). The direct radio link in ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface. The PC5 is a reference point between ProSe usable UEs (ProSe-enabled UE) used for a control plane and a user plane for the ProSe direct discovery, the ProSe direct communication, and a ProSe UE-to-Network relay.

For modes of the ProSe, "direct discovery (Direct Discovery)", "direct communication (Direct Communication)", and "Relay" are defined. "Relay" will be described later.

The direct discovery is a mode of searching for a partner destination by directly transmitting, between the UEs, a discovery message (discovery signal) that does not specify a specific destination. The direct discovery may be a procedure for discovering another UE in the vicinity of the UE by using a direct radio signal in E-UTRA (Evolved Universal Terrestrial Radio Access) via the PC5. Alternatively, the direct discovery may be procedure adopted by a UE 100 capable of executing the proximity-based service for discovering another UE 100 capable of executing the proximity-based service by using only a capability of the two UEs 100 with the help of the E-UTRA technology. The direct discovery may be supported only if the service is provided to the UE 100 by the E-UTRAN (eNB 200 (cell)). The service may be provided by the E-UTRAN if the UE 100 is connected to the cell (eNB 200) or exists in the cell.

A resource allocation type for the transmission (announcement) of the discovery message (discovery signal) includes "Type 1" and "Type 2 (Type 2B)". In "Type 1", the UE 100 selects a radio resource. In "Type 2 (Type 2B)", the eNB 200 allocates a radio resource. In Type 1, the UE 100 may select a radio resource from resource pools provided by the eNB 200. A radio resource (resource pool) of "type 1" corresponds to a radio resource (resource pool) for UE-selected transmission scheme. A radio resource (resource pool) of "type 2 (type 2B)" corresponds to a radio resource (resource pool) for an eNB controlled transmission scheme (eNB-controlled transmission scheme).

A "Sidelink Direct Discovery" protocol stack includes a physical (PHY) layer, a MAC layer, and a ProSe protocol.

The direct communication is, for example, a mode in which data is directly transmitted between the UEs by specifying a specific destination (destination group). The direct communication may be communication between two or more UEs capable of executing the proximity-based services through user plane transmission in which the E-UTRA technology is used via a path without passing through any network node.

A resource allocation type of the direct communication includes "Mode 1" and "Mode 2". In "Mode 1", the eNB 200 assigns a radio resource of the direct communication. In "Mode 2", the UE 100 selects a radio resource of the direct communication. In Mode 2, the UE 100 may select a radio resource from the resource pools provided by the eNB 200. A radio resource (resource pool) of "mode 1" corresponds to a radio resource (resource pool) for an eNB-control transmission method. A radio resource (resource pool) of "mode 2" corresponds to a radio resource (resource pool) for a UE-selection transmission method.

The protocol stack of the user plane in the side link communication (direct communication) in the PC5 includes a physical (PHY) layer, a MAC layer, an RLC layer, and a PDCP layer. The control plane protocol stack for the side link broadcast control channel (SBCCH) in the PC5 includes a physical (PHY) layer, a MAC layer, an RLC layer, and an RRC layer. The control plane protocol stack for one-to-one side-link communication includes the physical (PHY) layer, the MAC layer, the RLC layer, the PDCP layer, and the PC5 signaling protocol.

In the side link, various kinds of information are transmitted by using the following channels.

Physical channels for side links include Physical Side Link Broadcast Channel (PSBCH), Physical Side Link Discovery Channel (PSDCH), Physical Side Link Control Channel (PSCCH) and Physical Side Link Shared Channel (PSSCH).

PSBCH is a channel for transmitting system and synchronization related information (for example, synchronization signal). The PSDCH is a channel for transmitting a side link discovery message (discovery signal) from the UE. The PSCCH is a channel for transmitting control information from the UE for side link communication. The PSSCH is a channel for transmitting data from the UE for side link communication.

Transport channels for side links include side link broadcast channel (SL-BCH), side link discovery channel (SL-DCH), and side link shared channel (SL-SCH). SL-BCH is mapped to PSBCH. The SL-DCH is mapped to the PSDCH. The SL-SCH is mapped to the PSSCH.

The logical channels (control channels, traffic channels) related to the side links include a side link broadcast control channel (SBCCH) and a side link traffic channel (STCH).

The SBCCH is a side link channel for broadcasting side link system information from one UE to another UE (s). The STCH is a point-to-multipoint channel for transferring user information (data) from one UE to another UE (s). The STCH is used only in the UE capable of side link communication. The STCH may be used for point-to-point communication between two side-link communicatable UEs. STCH is mapped to SL-SCH. SBCCH is mapped to SL-BCH.

(Radio Terminal)

The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 120 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100. The UE 100 may have a function of predicting position, such as an electronic compass, an acceleration sensor, and the like.

The UE 100 is a communication device having a function capable of executing direct signaling transmission and/or reception with another communication device. Therefore, it goes without saying that the UE 100 may have other configurations (for example, functions, members, etc.).

For simplicity, a process executed by at least any one of the receiver 110, the transmitter 120, and the controller 130 included in the UE 100 is described herein as a process (operation) executed by the UE 100.

(Base Station)

Figure 5:
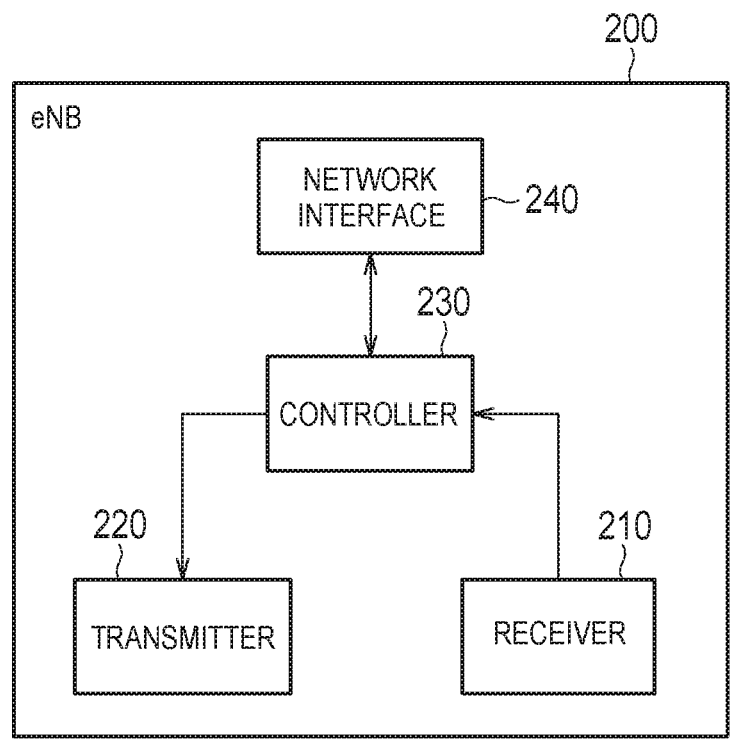
FIG. 5 is a block diagram of an eNB 200.

The eNB 200 (base station) according to the embodiment will be described. FIG. 5 is a block diagram of the eNB 200. As illustrated in FIG. 5, the eNB 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour eNB 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the eNB 200 is described herein as a process (operation) executed by the eNB 200.

Operations According to the Embodiment

The operations according to the embodiment will be described by the following operation examples 1 and 2.

(A) Operation Example 1

Figure 6:
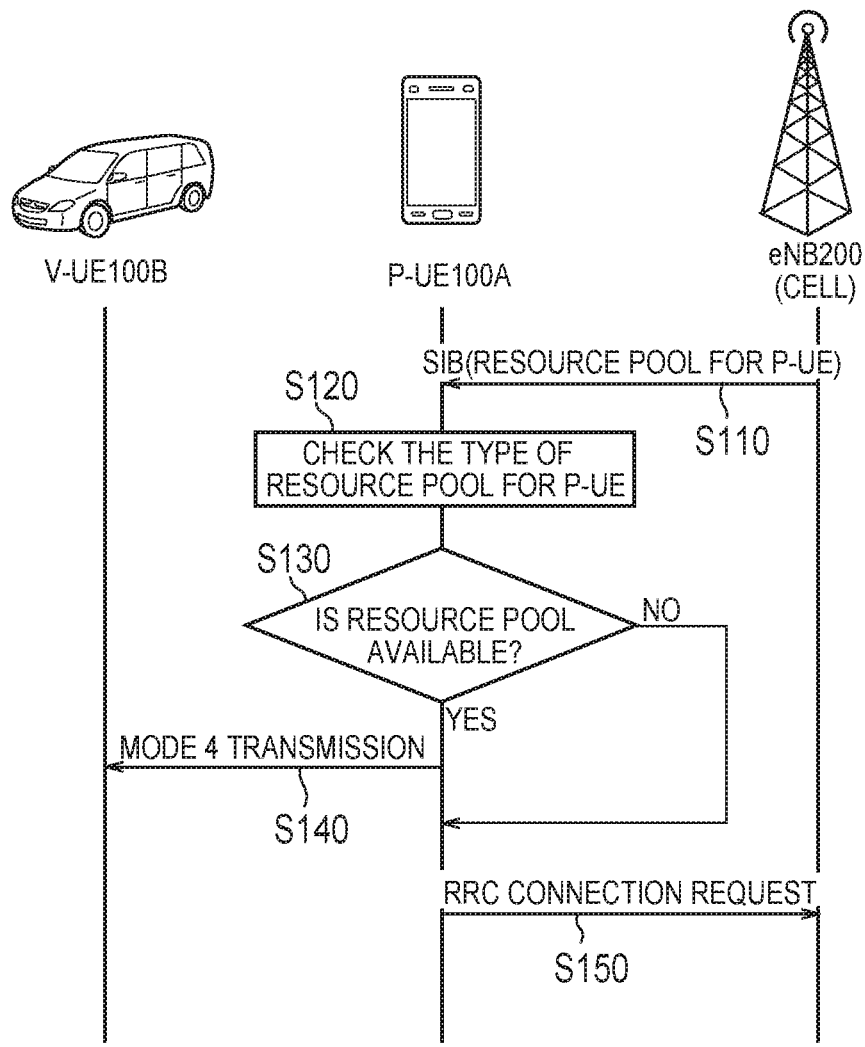
FIG. 6 is a sequence diagram (part 1) for explaining an operation example 1.
Figure 7:
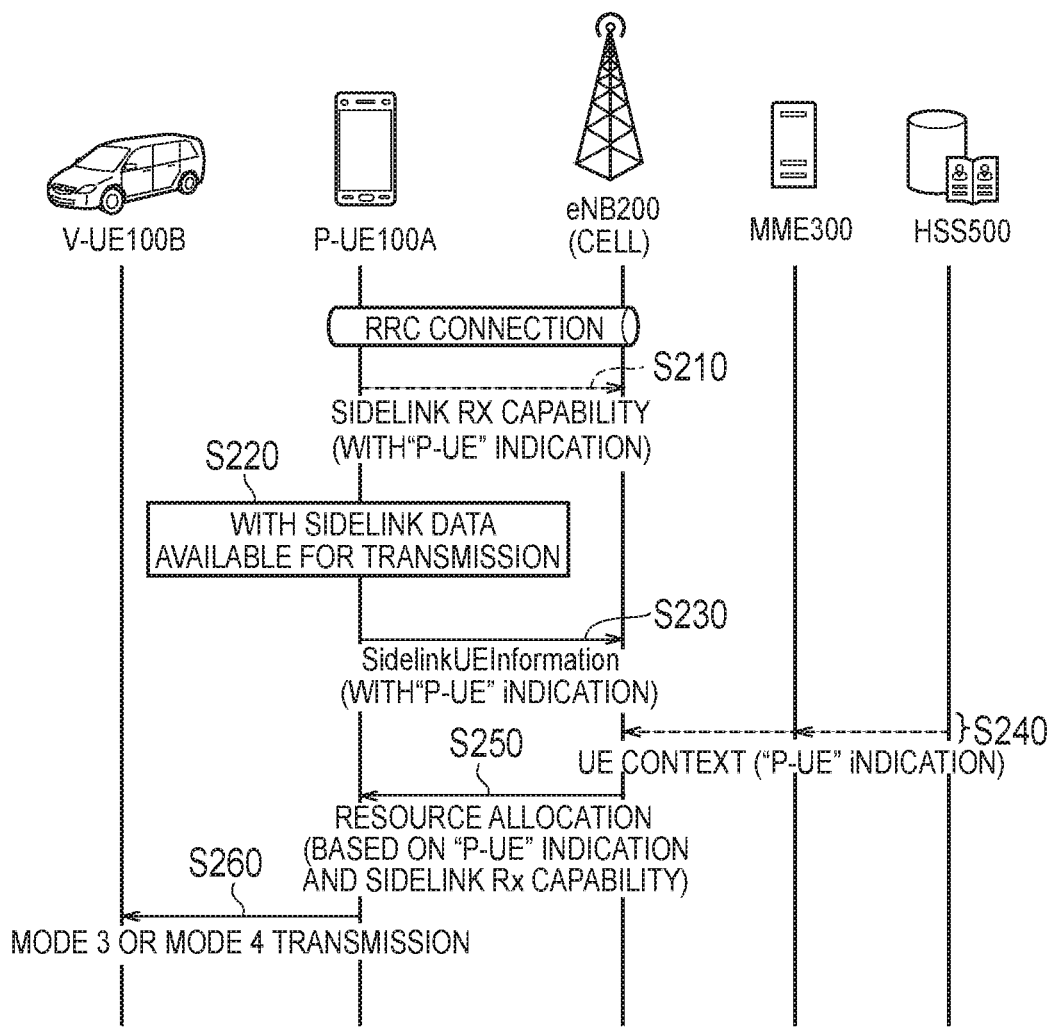
FIG. 7 is a sequence diagram (part 2) for explaining the operation example 1.

An operation example 1 will be described with reference to FIGS. 6 and 7. FIG. 6 is a sequence diagram (part 1) for explaining the operation example 1. FIG. 7 is a sequence diagram (part 2) for explaining the operation example 1.

(a) Operations in RRC Idle State

Referring to FIG. 6, a P-UE 100A has a pedestrian-type function. The P-UE 100A is initially in an RRC idle state. The P-UE 100A may camp in a cell managed by the eNB 200. A V-UE 100B has a vehicle-type function.

In step S110, the eNB 200 transmits information on a resource pool for P-UE to the P-UE 100A. The P-UE 100A receives the resource pool transmitted from the eNB 200 to the P-UE 100A.

The eNB 200 may transmit the information on the resource pool to the P-UE 100A by broadcast signaling (for example, system information block (SIB)).

The resource pool is formed from a plurality of time/frequency resources. The resource pool is a resource pool for inter-terminal communication. Specifically, the resource pool is a resource pool for P2V communication. The inter-terminal communication is communication (transmission/reception) using Sidelink (neighborhood service), for example.

The resource pool may be a resource pool (first resource pool) that needs sensing for the use of the resource pool. To use the first resource pool, the P-UE 100A senses the first resource pool. That is, the P-UE 100A attempts to monitor a radio signal (in particular, a direct radio signal for P2V communication) in at least some of radio resources in the first resource pool. The P-UE 100A determines unused radio resources according to the sensing result. The P-UE 100A executes P2V communication using the unused radio resources. The sensing time may be shorter than the sensing time required for the V-UE 100B to perform V2V (or V2X) communication. Thus, the P-UE 100A can reduce power consumption.

Since sensing is necessary for the first resource pool, the first resource pool may be usable by only the P-UE 100 having reception capability in inter-terminal communication (for example, Sidelink Rx capability). The first resource pool may be unusable by the P-UE 100 having no reception capability in inter-terminal communication.

When the P-UE 100A has reception capability in inter-terminal communication, the P-UE 100A can receive a radio signal transmitted in inter-terminal communication. When the P-UE 100A has no reception capability in inter-terminal communication, the P-UE 100A cannot receive a radio signal transmitted in inter-terminal communication.

The resource pool may be a second resource pool that does not require sensing for the use of the resource pool. The second resource pool may be an exceptional resource pool (exceptional pool) of the first resource pool. The second resource pool may be usable only when the first resource pool is unusable.

The P-UE 100A may randomly select radio resources for P2V communication from the second resource pool. Transmission using radio resources in the second resource pool may be permitted for only the P-UE 100A.

The eNB 200 may provide information indicating that the serving cell (serving frequency) is a cell (frequency) in which P2V communication (transmission) is recommended. The eNB 200 may provide (transmit) the information to the P-UE 100A by broadcast signaling (for example, SIB). The eNB 200 may provide (transmit) the information together with the information on the resource pool.

The P-UE 100A may determine whether or not to perform the following operations based on the information. The P-UE 100A may execute the following operations only when the serving cell is a cell in which P2V communication is recommended. When the serving cell is not a cell in which P2V communication is recommended, the P-UE 100A may omit the following operations.

In step S120, the P-UE 100A may check the type of the resource pool received from the eNB 200.

In step S130, the P-UE 100A may determine whether or not the resource pool is usable according to the type of the resource pool.

The P-UE 100A may determine that the resource pool is usable when the resource pool provided by the eNB 200 is the first resource pool (in need of sensing). The P-UE 100A may determine that the resource pool is usable when the resource pool provided by the eNB 200 is the second resource pool (in no need of sensing).

The P-UE 100A may determine whether or not the resource pool is usable according to the type of the resource pool and the capability of the P-UE 100A.

When the resource pool (type) is the first resource pool, the P-UE 100A may determine that the resource pool is unusable when the P-UE 100A has no reception capability in inter-terminal communication (P2V communication). The P-UE 100A may determine that the resource pool is usable when the P-UE 100A has reception capability in inter-terminal communication.

In the case where the resource pool (type) is the second resource pool, the P-UE 100A may determine that the resource pool is usable when the P-UE 100A has no reception capability in inter-terminal communication (P2V communication). The P-UE 100A may determine that the resource pool is unusable when the P-UE 100A has reception capability in inter-terminal communication.

The eNB 200 may inform the P-UE 100A that the P-UE 100 capable of using the second resource pool is only the P-UE 100 having no reception capability in inter-terminal communication (P2V communication). The eNB 200 may transmit the information to the P-UE 100A by broadcast signaling (for example, SIB). The P-UE 100A may determine whether or not the resource pool is usable based on the information.

The P-UE 100A may execute step S140 when determining that the resource pool is usable. The P-UE 100A may execute step S150 when determining that the resource pool is usable.

In step S140, the P-UE 100A can perform P2V transmission using the usable resource pool. For example, when using the first resource pool, the P-UE 100A selects unused radio resources from the first resource pool based on the sensing result. The P-UE 100A transmits a direct radio signal by P2V communication using the selected radio resources. The V-UE 100B monitors radio signals in the resource pool provided by the eNB 200. Accordingly, the V-UE 100B receives the radio signal from the P-UE 100A. The V-UE 100B may perform control relating to movement based on the radio signal from the P-UE 100A.

When using the second resource pool, the P-UE 100A may randomly select radio resources from the second resource pool. The other operations are the same as in the case where the first resource pool is used.

As described above, the P-UE 100A autonomously selects radio resources when the resource pool is usable. The P-UE 100A can transmit a direct radio signal by P2V communication using the selected radio resources (Mode 4 transmission).

In step S150, the P-UE 100A may initiate a control to transition from the RRC idle state to the RRC connected state in order to request radio resources for inter-terminal communication to the eNB 200 (network). That is, the P-UE 100A may transmit an RRC connection request to the eNB 200. Thereafter, the P-UE 100A transitions to the RRC connected state. That is, the P-UE 100A establishes an RRC connection with the eNB 200 (cell (primary cell/serving cell)). The operations of the P-UE 100A in the RRC connected state will be described later.

The P-UE 100A may transition from the RRC idle state to the RRC connected state when determining that the resource pool is usable. The P-UE 100A may transition from the RRC idle state to the RRC connected state when no resource pool for inter-terminal communication (P2V communication) is provided. That is, the P-UE 100A may transition from the RRC idle state to the RRC connected state when no P2V communication can be executed in the RRC idle state.

In this manner, the P-UE 100A may determine whether or not to execute Mode 4 transmission depending on whether or not a resource pool for inter-terminal communication (P2V communication) is provided.

(b) Operations in the RRC Connected State

Next, the RRC connected state will be described with reference to FIG. 7. The P-UE 100A is initially in the RRC connected state. The P-UE 100A establishes an RRC connection with the eNB 200 (cell).

The P-UE 100A may execute the following operations after executing the operations in the idle state described above. The P-UE 100A may perform the following operations irrespective of whether the P-UE 100A has performed the operations in the idle state described above.

In step S210, the P-UE 100A may transmit information indicating whether or not the P-UE 100A has reception capability in inter-terminal communication (Sidelink Rx Capability) to the eNB 200.

The P-UE 100A may transmit information ("P-UE" indication) indicating whether or not the P-UE 100A has a pedestrian-type function (whether it is a P-UE) to the eNB 200. The P-UE 100A may transmit "P-UE" indication along with Sidelink Rx Capability to the eNB 200. The P-UE 100A may transmit the "P-UE" indication to the eNB 200 only when it has a pedestrian-type function. When the P-UE 100A has no longer a pedestrian-type function, the P-UE 100A may transmit the "P-UE" indication indicating that it has no pedestrian-type function to the eNB 200. The P-UE 100A may transmit the "P-UE" indication as the capability information (Capability) of the P-UE 100A to the eNB 200. In this manner, the P-UE 100A may transmit the "P-UE" indication in advance to the eNB 200 regardless of whether or not inter-terminal communication (P2V communication) is to be executed.

The eNB 200 can determine whether or not the P-UE 100A has the reception capability in inter-terminal communication by Sidelink Rx Capability. The eNB 200 can determine whether the P-UE 100A has the pedestrian-type function (that is, whether or not it is a pedestrian UE) by the "P-UE" indication.

In step S220, it is assumed that data for inter-terminal communication (Sidelink data) usable for transmission is generated in the P-UE 100A. Data to be transmitted by P2V communication may be generated in the P-UE 100A.

In step S230, the P-UE 100A transmits to the eNB 200 a message for requesting radio resources for inter-terminal communication. The P-UE 100A may include information indicating the amount of data to be transmitted in the message. The P-UE 100A may include "P-UE" indication in the message.

In step S240, the eNB 200 may receive information for grasping the "P-UE" indication from an upper network device. For example, the eNB 200 may receive UE context including the "P-UE" indication from an HSS 500 via an MME 300. The eNB 200 may determine whether the P-UE 100A has the pedestrian-type function based on the UE context.

The eNB 200 may send a message for requesting the "P-UE" indication to the MME 300 (or the HSS 500). Upon reception of the message, the MME 300 (or the HSS 500) may send the "P-UE" indication (UE context) to the eNB 200.

In step S250, the eNB 200 allocates radio resources to the P-UE 100A. When the P-UE 100A has the pedestrian-type function, the eNB 200 allocates radio resources (resource pool) to be allocated to the P-UE 100A, out of the radio resources (resource pools) for P-UE.

When the eNB 200 determines that the P-UE 100A has the pedestrian-type function, the eNB 200 can allocate radio resources (resource pool) according to the capability of the P-UE 100A.

The eNB 200 may allocate the first resource pool to the P-UE 100A (only) when the P-UE 100A has the reception capability in inter-terminal communication. The eNB 200 may not allocate the second resource pool to the P-UE 100A when the P-UE 100A has the reception capability in inter-terminal communication.

The eNB 200 may allocate the second resource pool to the P-UE 100A when the P-UE 100A has no reception capability in inter-terminal communication. The eNB 200 may not allocate the first resource pool to the P-UE 100A when the P-UE 100A has no reception capability in inter-terminal communication. The eNB 200 may allocate the second resource pool only to the P-UE 100 that has no reception capability in inter-terminal communication.

When the eNB 200 does not permit inter-terminal communication (Mode 4 transmission) using a resource pool, the eNB 200 may allocate time/frequency resources to the P-UE 100A. Even when the eNB 200 permits inter-terminal communication (Mode 4 transmission) using a resource pool, the eNB 200 may allocate time/frequency resources to the P-UE 100A.

The P-UE 100A receives the radio resources (resource pool) allocated from the eNB 200.

In step S260, the P-UE 100A executes transmission by inter-terminal communication using the allocated radio resources (resource pool).

When time/frequency resources are allocated instead of a resource pool, the P-UE 100A executes transmission by inter-terminal communication using the resources (Mode 3 transmission). That is, the P-UE 100A executes transmission by inter-terminal communication under the control of the eNB 200.

When the allocated radio resources are in the resource pool, the V-UE 100B can receive a direct radio signal from the P-UE 100A by monitoring in the resource pool.

The eNB 200 may notify the V-UE 100 of the allocated radio resources by broadcast or unicast. The V-UE 100 can receive a direct radio signal from the P-UE 100A by executing monitoring in the notified radio resources.

When a resource pool is allocated, the P-UE 100A executes Mode 4 transmission in the same manner in the RRC idle state. Specifically, the P-UE 100A selects an unused radio resource from among the allocated resource pool. The P-UE 100A transmits a direct radio signal by P2V communication using the selected radio resources. The V-UE 100B monitors radio signals in the resource pool provided by the eNB 200. Accordingly, the V-UE 100B receives the radio signal from the P-UE 100A.

Accordingly, the P-UE 100A can appropriately grasp the usable radio resources and properly execute P2V communication.

(B) Operation Example 2

Figure 8:
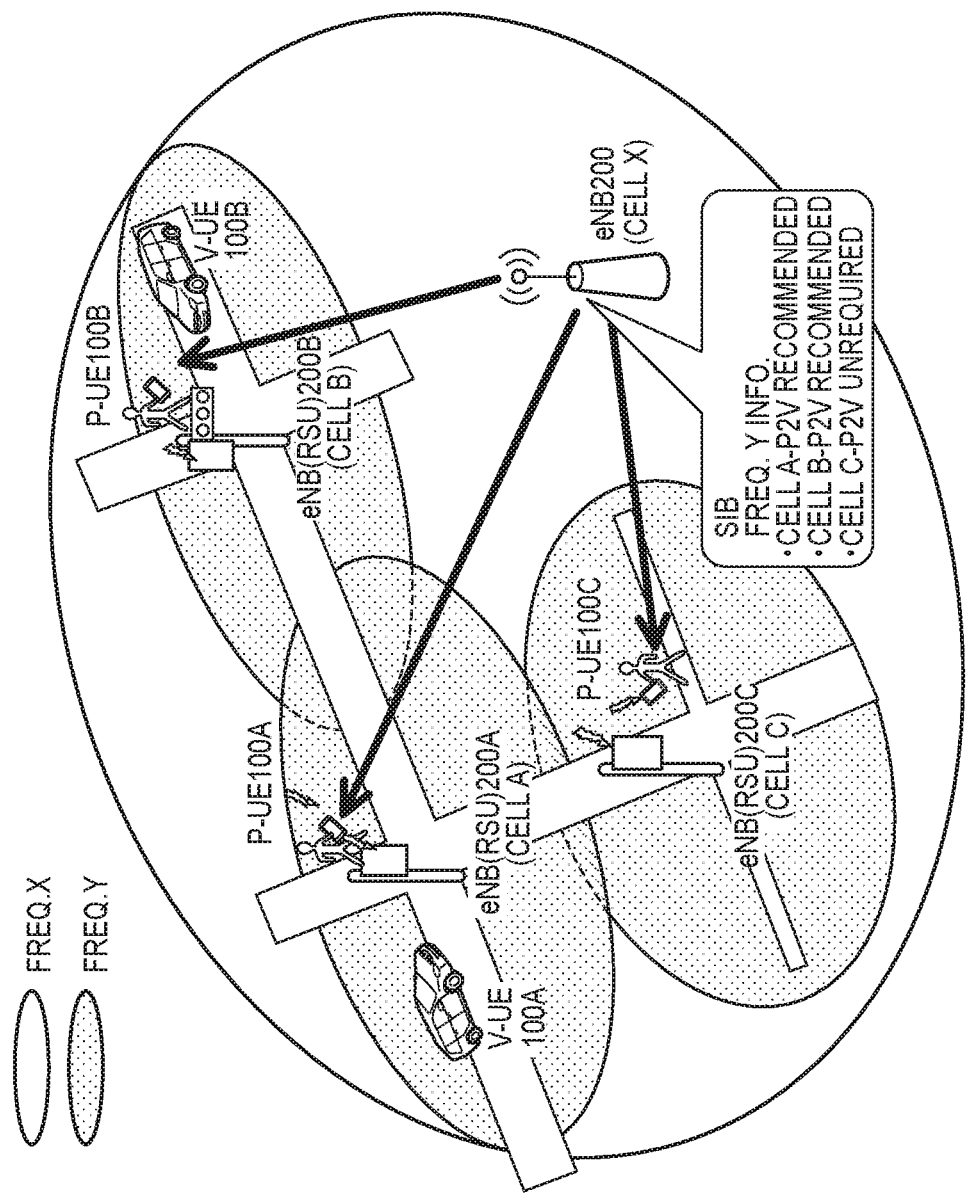
FIG. 8 is a diagram (part 1) for explaining an operation example 2.
Figure 9:
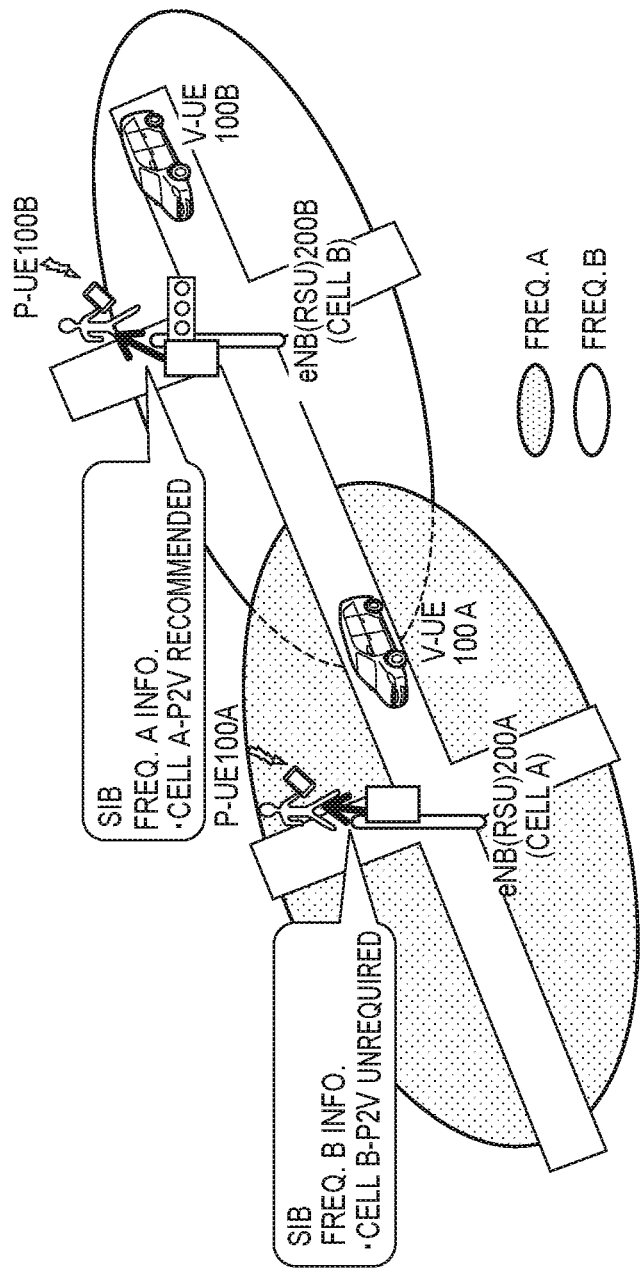
FIG. 9 is a diagram (part 2) for explaining the operation example 2.

Operation example 2 will be described with reference to FIGS. 8 and 9. FIG. 8 is a diagram (part 1) for explaining the operation example 2. FIG. 9 is a diagram (part 2) for explaining the operation example 2.

In FIG. 8, P-UEs 100 (P-UE 100A, P-UE 100B, and P-UE 100C) are connected or camped to a cell X managed by the eNB 200. The cell X is a cell for cellular communication. The cell X belongs to a frequency X for cellular communication.

An eNB 200A manages a cell A belonging to a frequency Y. An eNB 200B manages a cell B belonging to the frequency Y. An eNB 200C manages a cell C belonging to the frequency Y. The cell A, the cell B, and the cell C are cells for V2X communication. The cell A, the cell B, and the cell C overlap the cell X at least partially. The frequency Y is a frequency for V2X communication. The frequency Y is different from the frequency X. The eNB 200A, the eNB 200B, and the eNB 200C may be road side units (RSUs).

The eNB 200 can provide each of the P-UEs 100 with information indicating at least one of cell and frequency in which P2V transmission is recommended (recommendation information). The eNB 200 may provide (transmit) the recommendation information to the P-UE 100A by individual signaling (for example, RRC reconfiguration message, DCI, etc.) and/or broadcast signaling (for example, SIB).

The eNB 200 can provide each of the P-UEs 100 with recommendation information indicating whether or not the cell for V2X communication (frequency Y) is a recommended cell (frequency). For example, the eNB 200 can provide each of the P-UEs 100 with recommendation information indicating that P2V transmission is recommended in the cell A and the cell B, and P2V communication is not recommended in the cell C. As an example, P2V transmission may be recommended for cells managed by the eNBs (RSUs) 200A and 200B set at locations where the traffic volume of vehicles is large. P2V transmission may be recommended for cells managed by the eNB (RSU) 200C set at a location where the traffic volume of vehicles is small.

Based on the recommendation information, the P-UE 100A may determine the execution of P2V transmission in the cell A (frequency Y). In this case, the P-UE 100A may perform the operation of the operation example 1 described above. The P-UE 100A may execute P2V transmission using a resource pool provided from the eNB (RSU) 200A, for example. In this manner, the recommendation information may be a trigger for P2V transmission. The V-UE 100A executing V2X communication with the eNB (RSU) 200A can receive P2V transmission from the P-UE 100A by monitoring the resource pool of the same frequency. This also applies to the P-UE 100B. On the other hand, the P-UE 100C may determine non-execution of P2V transmission in the cell C (frequency Y) based on the recommendation information.

As illustrated in FIG. 9, the eNB (RSU) 200 may provide the P-UE 100 with recommendation information in a neighbor cell for V2X communication.

For example, the eNB (RSU) 200B provides the P-UE 100A (and the P-UE 100B) with recommendation information indicating that P2V transmission is recommended in the cell A (frequency A). As a result, the P-UE 100A can recognize that P2V transmission is recommended in the cell A before entering the cell A. The recommendation information in the cell A provided by the eNB (RSU) 200B may include information on the resource pool used for P2V transmission in the cell A. As a result, the P-UE 100A can execute P2V transmission as soon as it enters the cell A. The V-UE 100A can receive P2V transmission as soon as it enters the cell A.

The frequency A managed by the eNB (RSU) 200A and the frequency B managed by the eNB (RSU) 200B may be the same. The frequency A and the frequency B may be different.

Other Embodiments

The contents of the present application have been explained in accordance with the embodiments described above. However, it should not be understood that the description and drawings constituting a part of this disclosure limit the contents of the present application. From this disclosure, various alternative embodiments, examples, and operational techniques will be apparent to those skilled in the art.

The P-UE 100A has been mainly described above as performing inter-terminal communication using Sidelink, but the present invention is not limited to this. The P-UE 100A may execute the above-described operations for transmission/reception of direct radio signals such as a discovery signal (message) and PC 5 signaling. The P-UE 100A may execute the above-described operations for transmission/reception of direct radio signals in a system other than the LTE system.

When the P-UE 100A has no transmission capability (for example, Sidelink Tx capability) in inter-terminal communication, the P-UE 100A may perform P2V transmission (via Uu) with the intervention of the eNB 200.

The operations (operation examples) according to the embodiment described above may be executed in combination as appropriate. In each of the above-described sequences, all operations are not necessarily indispensable. For example, in each of the sequences, only some of the operations may be executed.

Although not specifically mentioned in relation to each of the above-described embodiments, there may be provided programs for causing a computer to execute processes to be performed by any of the above-described nodes (the UE 100, the eNB 200, etc.). The programs may be recorded on a computer readable medium. By using the computer readable medium, the programs can be installed in a computer. The computer readable medium on which the programs are recorded may be a non-transitory recording medium. The non-transitory recording medium is not particularly limited, but it may be a recording medium such as CD-ROM or DVD-ROM, for example.

There may be provided a chip that is formed from a memory storing programs for executing processes to be performed by either the UE 100 or the eNB 200 and a processor to execute the programs stored in the memory.

In relation to the above-described embodiments, the LTE system has been described as an example of the mobile communication system, but the present invention is not limited to the LTE system. The contents according to the present application may be applied to a system other than the LTE system.

[Supplementary Note]
(1) Introduction
P2V-type service is more-power efficient for Pedestrian UE than V2P-type service. Further features of P2V communication will be discussed.
(2) Discussion
(2.1) P-UE without Sidelink Reception Capability
It is assumed that Pedestrian UE (P-UE) may not have sidelink reception capability. The P-UE without sidelink reception capability cannot perform sensing, so if the P-UE wants to perform the P2V transmission, the P-UE needs to follow either the eNB-controlled transmission scheme or UE-selected transmission scheme without sensing. Considering the P-UE without sidelink reception capability in RRC_IDLE, if eNB provides the transmission resource pool without sensing in SIB, UE can use it directly. And if eNB doesn't provide the transmission resource pool without sensing in SIB, P-UE should transit to the RRC_CONNECTED to request the transmission resource. Considering the P-UE without sidelink reception capability in RRC_CONNECTED, eNB will provide the transmission resource (pool) via the dedicated signalling. In that case, eNB needs to know whether the P-UE without sidelink reception capability needs the transmission resource (pool) without sensing. So the P-UE without the sidelink reception capability in RRC_CONNECTED should inform the necessity of transmission resource without sensing to the eNB.

Observation 1: P-UE without the sidelink reception capability in RRC_CONNECTED should inform the necessity of transmission resource without sensing to the eNB.

(2.2) P-UE with Sidelink Reception Capability
As discussed in previous section, the P-UE without sidelink reception capability needs to use either the resource for eNB-controlled transmission scheme or the resource pool for UE-selected transmission scheme without sensing. On the other hand, it's still FFS whether the P-UE with sidelink reception capability is allowed to use both resource pool for UE-selected transmission scheme with partial sensing (i.e. sensing during a limited time) and resource pool for UE-selected transmission scheme without sensing, but from the radio capability perspective, the P-UE with the sidelink reception capability can use both types of the resource pools. From the P-UE's perspective, lower battery consumption is better, so it's helpful that P-UE with the sidelink reception capability can also use the transmission resource without sensing. However, considering the UE-selected transmission scheme, the transmission resource collision will occur in the transmission resource pool without sensing. So it's desirable that eNB can control whether the transmission resource pool without sensing will be provided to the P-UE with sidelink reception capability.

Considering the P-UE with the sidelink reception capability in RRC_IDLE, from the P-UE's perspective, it will be useful that P-UE with the sidelink reception capability will select the transmission resource which can minimize the P-UE's power consumption. However, from the eNB perspective, in order to control the transmission resource collision by limiting the number of P-UE using the transmission resource pool without sensing, it may be useful that the eNB inform the P-UE with the sidelink reception capability of whether or not the transmission resource without sensing can be used.

On the other hand, considering the P-UE with the sidelink reception capability in RRC_CONNECTED, the eNB can provide the suitable resource to the P-UE with sidelink reception capability taken into account of the collision probability of UE-selected transmission resource and the P-UE's power efficiency.

Proposal 1: It should discuss whether or not the eNB can inform the P-UE with sidelink reception capability the permission to use the resource pool without sensing.

The invention claimed is:

1. A user equipment as a pedestrian user equipment, comprising:
   a transmitter configured to perform Pedestrian-to-Everything (P2X) communication that is a direct inter-terminal communication with another user equipment;
   a receiver configured to receive, when the pedestrian user equipment is in a radio resource control (RRC) idle state, from a base station a message including a resource pool; and
   a controller configured to:
      when the pedestrian user equipment is in the RRC idle state, determine whether or not the resource pool included in the message is a P2X resource pool for the P2X communication;
      in accordance with a determination that the resource pool included in the message is not the P2X resource pool for the P2X communication, transition from the RRC idle state to an RRC connected state for requesting a radio resource for the P2X communication to the base station, wherein
   the transmitter is configured to, when the pedestrian user equipment is in the RRC connected mode, transmit capability information indicating whether the pedestrian user equipment supports sensing, and
   the receiver is configured to, when the pedestrian user equipment is in the RRC connected mode, receive information indicating a resource pool that is a resource pool requiring the sensing for use of the resource pool.

2. The user equipment according to claim 1, wherein the controller is configured to determine whether or not the resource pool included in the message is the P2X resource pool according to a type of the resource pool.

3. The user equipment according to claim 1, wherein the controller is configured to include information indicating whether or not the user equipment is the pedestrian user equipment in a first message for requesting the radio resource, and
   the transmitter is configured to transmit the first message to the base station.

4. An apparatus that controls a user equipment as a pedestrian user equipment, the apparatus comprising:
   at least one processor and a memory communicatively coupled to the at least one processor, the at least one processor is configured to execute processes of:
      performing Pedestrian-to-Everything (P2X) communication that is a direct inter-terminal communication with another user equipment;
      when the pedestrian user equipment is in a radio resource control (RRC) idle state, receiving from a base station a message including a resource pool;
      when the pedestrian user equipment is in the RRC idle state, determining whether or not the resource pool included in the message is a P2X resource pool for the P2X communication; and
      in accordance with a determination that resource pool included in the message is not the P2X resource pool for the P2X communication, transitioning from the RRC idle state to an RRC connected state for requesting a radio resource for the P2X communication to the base station, wherein
   when the pedestrian user equipment is in the RRC connected mode, transmitting capability information indicating whether the pedestrian user equipment supports sensing, and
   when the pedestrian user equipment is in the RRC connected mode, receiving information indicating a resource pool that is a resource pool requiring the sensing for use of the resource pool.

5. A communication method comprising:
   performing by a user equipment as a pedestrian user equipment, Pedestrian-to-Everything (P2X) communication that is a direct inter-terminal communication with another user equipment;
   when the pedestrian user equipment is in a radio resource control (ARC) idle state, receiving by the pedestrian user equipment from a base station, a message including a resource pool;
   when the pedestrian user equipment is in the ARC idle state, determining whether or not the resource pool included in the message is a P2X resource pool for the P2X communication; and
   in accordance with a determination that the resource pool included in the message is not the resource pool for the P2X communication, transitioning from the ARC idle state to an ARC connected state for requesting a radio resource for the P2X communication to the base station,
   wherein when the pedestrian user equipment is in the ARC connected mode, transmitting capability information indicating whether the pedestrian user equipment supports sensing, and
   when the pedestrian user equipment is in the ARC connected mode, receiving information indicating a resource pool that is a resource pool requiring the sensing for use of the resource pool.

* * * * *